United States Patent
Corcoran

(12) 
(10) Patent No.: US 6,616,148 B1
(45) Date of Patent: Sep. 9, 2003

(54) KEYLESS CHUCK WITH BACKUP KEY OPERATION

(76) Inventor: Jerry Corcoran, 1586 N. Redwood St., Canby, OR (US) 97013

( * ) Notice: Subject to any disclaimer, the term of this patent is extended or adjusted under 35 U.S.C. 154(b) by 0 days.

(21) Appl. No.: 10/104,276

(22) Filed: Mar. 22, 2002

(51) Int. Cl.[7] ............................................... B23B 31/12
(52) U.S. Cl. ...................................................... 279/62
(58) Field of Search ........................... 279/60–65, 902, 279/66, 116, 150

(56) References Cited

U.S. PATENT DOCUMENTS

| | | | | |
|---|---|---|---|---|
| 210,875 | A | * 12/1878 | Pierce | 279/62 |
| 709,014 | A | * 9/1902 | Jacobs | 279/62 |
| 847,336 | A | * 3/1907 | Holmberg | 279/62 |
| 872,841 | A | * 12/1907 | North | 279/62 |
| 913,059 | A | * 2/1909 | Savage | 279/62 |
| 933,741 | A | * 9/1909 | Bradley | 279/62 |
| 955,326 | A | * 4/1910 | Drew | 279/61 |
| 2,451,565 | A | * 10/1948 | Landow | 279/150 |
| 4,669,932 | A | 6/1987 | Hartley | |
| 5,286,041 | A | 2/1994 | Rohm | |
| 5,882,016 | A | 3/1999 | Chiang | |
| 5,904,456 | A | 5/1999 | Chern | |
| 6,070,884 | A | 6/2000 | Mack | |

* cited by examiner

*Primary Examiner*—Steven C. Bishop
(74) *Attorney, Agent, or Firm*—Mark S Hubert

(57) ABSTRACT

A chuck that can be operated with or without a key, depending upon the amount of torque desired. The jaws are controlled by rotation of a screw ring about the axis of the chuck body that slides the jaws along jaw passages by engagement with teeth on the jaw surfaces. The screw ring is housed in a tightening knob that has a planar ring gear perpendicular to the chuck body axis. A tail section is rigidly attached to the chuck body below the tightening knob and houses a pinion gear that matingly engages the planar ring gear and rotates in concert with the tightening knob. Insertion of a hex key into a recess in the pinion gear allows the application of additional torque. Alternate embodiments incorporate a idler gear to reverse pinion gear rotation; locate the pinion gear in the tightening knob with the planar ring gear in the tail section; and utilize a planar ring gear on both the tail section and the tightening knob with a floating ring to house the pinion gear between the planar ring gears.

20 Claims, 4 Drawing Sheets

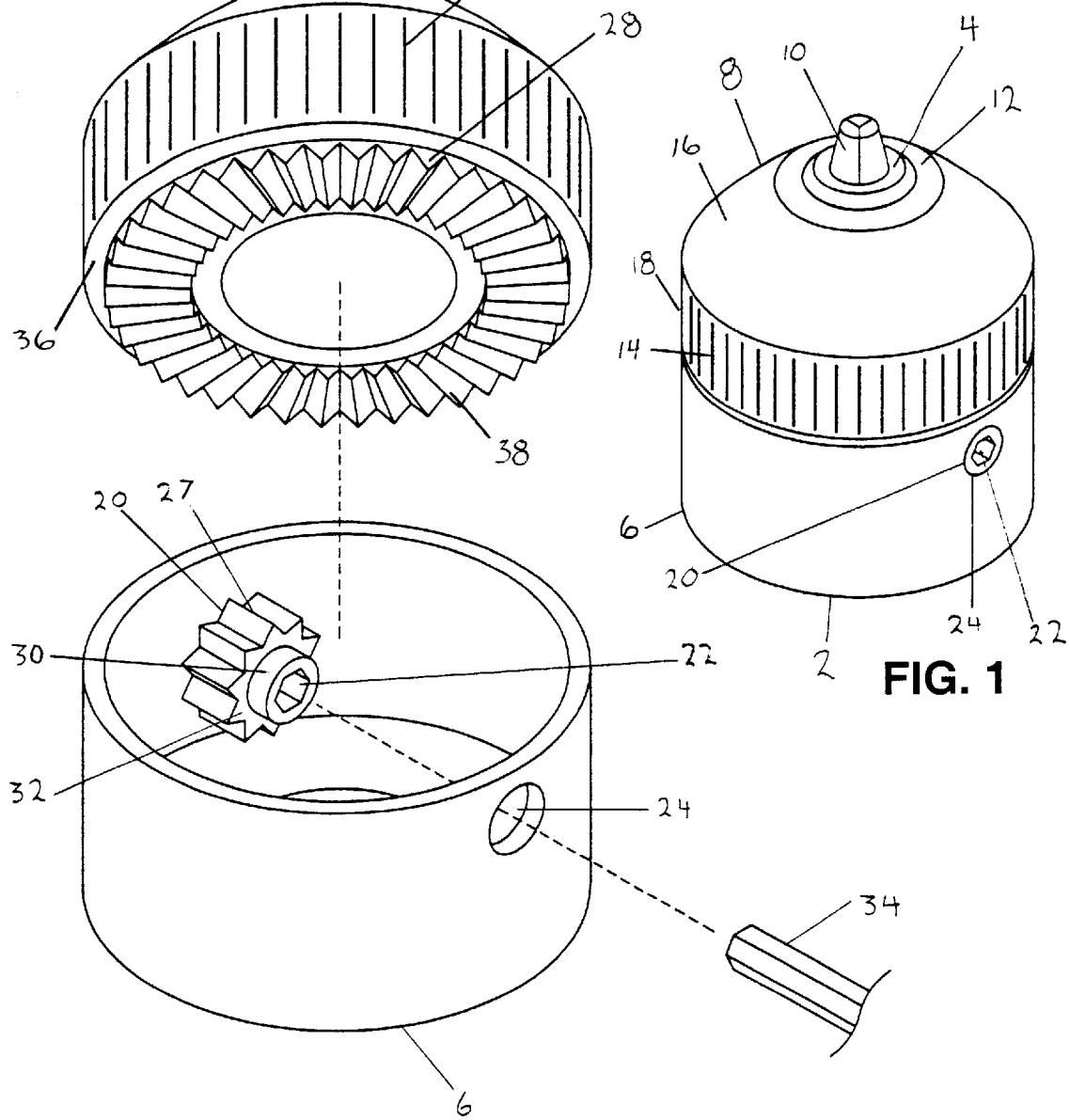

KEYLESS CHUCK WITH BACKUP KEY OPERATION

BACKGROUND OF THE INVENTION

The present invention relates to a keyless tool chuck, and more particularly relates to an improvement in construction of a chuck for firmly holding a tool such as a drill bit or a driver bit of electric work devices without assistance by a chuck key. This invention relates to a chuck for use with rotating equipment such as drills. Such rotating equipment is commonly driven manually or in the case of power drivers, electrically, hydraulicly or pneumatically. More particularly, the present invention relates to a keyless style of chuck which may be tightened or loosened by hand and can alternatively be tightened or loosened by rotation of a key after insertion into a recess formed in the chuck body.

Both hand and powered tool drivers are well known. The general configuration is a rear rotational driver, mechanically coupled to a chuck by threaded engagement or via a tapered sleeve that mates into a corresponding recess in the chuck body. The chuck has any number of circumferentially equally spaced jaws that are advanced concurrently both axially outward and radially inward from a front orifice. It is the advancement of these jaws that grip a tool or bit. The chuck may be used to hold any one of a multitude of tools such as screw or nut drivers and cutting, shaping or grinding bits, although the most common is a twist drill. With such a diverse selection of tool bits, the diameters and configurations of the shanks vary considerably from circular to polygonal in cross section. For this reason the chuck is adjustable over a relatively wide range.

Numerous chucks have been developed and are well known in the art. The most common type is found on the household hand drill. This is perhaps the most simple configuration with three jaws approximately spaced circumferentially 120 degrees apart from each other. Each jaw is housed in an angularly disposed passageway in the chuck body configured so that rotation of the chuck body in one direction with respect to a constrained nut engaging the jaws forces the jaws into gripping relationship with the tool bit. Counter rotation acts to release the gripping relationship. The rotation is commonly accomplished through the use of a key. If sufficient torque can be developed by hand rotation of the chuck, I.E. enough torque to hold the tool bit such that the rotating tool may be used without the disengagement or loosening of the tool bit from the jaws of the chuck, a key is not necessary. This is known as a "keyless" chuck, and the act of securing a tool bit in this manner is known as "keyless" operation. This is a desirable configuration in that bits can be quickly removed or inserted and lost or damaged keys do not hinder the process.

In the current state of the art, key and keyless chucks both have several disadvantages. First if they require a key, it is made of a specific size as all keys are not interchangeable. Keys are easily lost and the engagement teeth can become stripped. Replacement keys can often be hard to find. Second, this type of tightening is slow as it requires insertion and separate tightening at different axial positions around the chuck. If it is a hand tightening chuck it often does not hold the tool bit secure enough for arduous operations, or conversely it holds the tool bit too firm such that hand release of the bit is extremely difficult. The disadvantages of the keyed and keyless chucks are in direct opposition to their respective advantages. It would be desirable to have a hybrid style of chuck that is keyless with a backup keyed operation to remedy all of these drawbacks in the existing chucks. It would be desirable if the keyed operation was accomplished by a standard and commonly available key. Elimination of the multiple keying operations would serve to maintain the ease and speed of tightening the tool bits in the keyed fashion as would less turns of the key to advance and tighten the jaws. It would also be desirable to have a keyless chuck that requires fewer components or has a lower manufacturing cost.

SUMMARY OF THE INVENTION

In accordance with the invention, a keyless chuck includes a rotatable hand tightening knob with a planar ring gear on the back surface lying perpendicular to the axis of rotation. A pinion gear is housed in an internal cavity between the chuck body and a tail piece and is in mating engagement with the ring gear such that the pinion gear rotates as the tightening knob is rotated when advancing and closing the jaws. The pinion gear has a recess which is accessible through an orifice in the tail piece and is adapted accept a key device such as an hex key, or a screwdriver that when inserted and rotated, can provide additional torque to open or close the jaws. A second embodiment utilizes a substantially similar configuration but incorporates an idler gear to reverse rotation between the pinion gear and the tightening knob.

In a third embodiment of the keyless chuck, a keyless chuck includes a rotatable hand tightening knob with a pinion gear housed in a void formed in the tightening knob. The tail piece of the chuck has an planar ring gear on the front surface that lies perpendicular to the axis of rotation where the ring gear is in mating engagement with the pinion gear such that the pinion gear rotates as the knob is rotated to advance and close the jaws. The pinion gear has a recess that is accessible through an orifice in the tightening knob and corresponds to a key device such as an hex key, that when inserted and rotated, can provide additional torque to open or close the jaws.

In a fourth embodiment a keyless chuck includes a rotatable hand tightening knob with an planar ring gear formed on its back surface lying perpendicular to the axis of rotation. A tail piece has a planar ring gear on a front surface lying perpendicular to the axis of rotation and positioned such that its teeth oppose the teeth of the planar ring gear of the tightening knob. A pinion gear is housed in an internal cavity of a floating ring that fits between the knob and tail piece such that the pinion gear is matingly engaged with both the tail piece ring gear and the knob ring gear. The floating ring and pinion gear have corresponding recesses to accept a keyed device such as a hex key, that when inserted and rotated, will rotate the knob and tail piece in opposite directions thereby providing additional torque to open or close the jaws and closing the jaws in less turns as in the first and second embodiments.

In the final embodiment a keyless chuck includes a rotatable hand tightening knob with a planar ring gear formed on the back surface lying perpendicular to the axis of rotation. A set of two gears, a first pinion gear and a second idler gear are housed in an internal cavity of the tail piece such that the idler gear is in mating engagement with the ring gear. The idler gear rotates as the knob is rotated to advance and close the jaws. This causes the pinion gear to rotate in the opposite direction of the idler gear. The tail piece and pinion gear have corresponding recesses to accept a keyed device such as an hex key, that when inserted and rotated, can provide additional torque to open or close the jaws. This embodiment changes the direction that the pinion gear is rotated in the preferred embodiment to accomplish the same effect.

Accordingly, it is an object of the present invention to provide an improved keyless chuck with the ability to use a key to gain additional mechanical advantage to tighten or loosen the jaws.

It is a further object of the present invention to provide an improved chuck that uses a standard fastener tool to tighten or loosen the jaws.

It is yet another object of the present invention to provide an improved keyless chuck that eliminates the multiple keying operations common to the chuck industry.

It is still a further object of the present invention to provide an improved keyless chuck capable of an increased tightening torque over conventional chucks.

It is a final object of the present invention to provide an improved chuck that would require a minimum number of key turns to advance and tighten the jaws thus serving to increase the ease and speed of tightening the tool bits in the keyed fashion.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

BRIEF DESCRIPTION OF THE DRAWINGS

FIG. 1 is a perspective view of the keyless chuck with the jaws fully advanced;

FIG. 2 is an exploded view of the keyless chuck showing the interconnection between the pinion gear and the tightening knob's ring gear;

DETAILED DESCRIPTION

Figure 3:
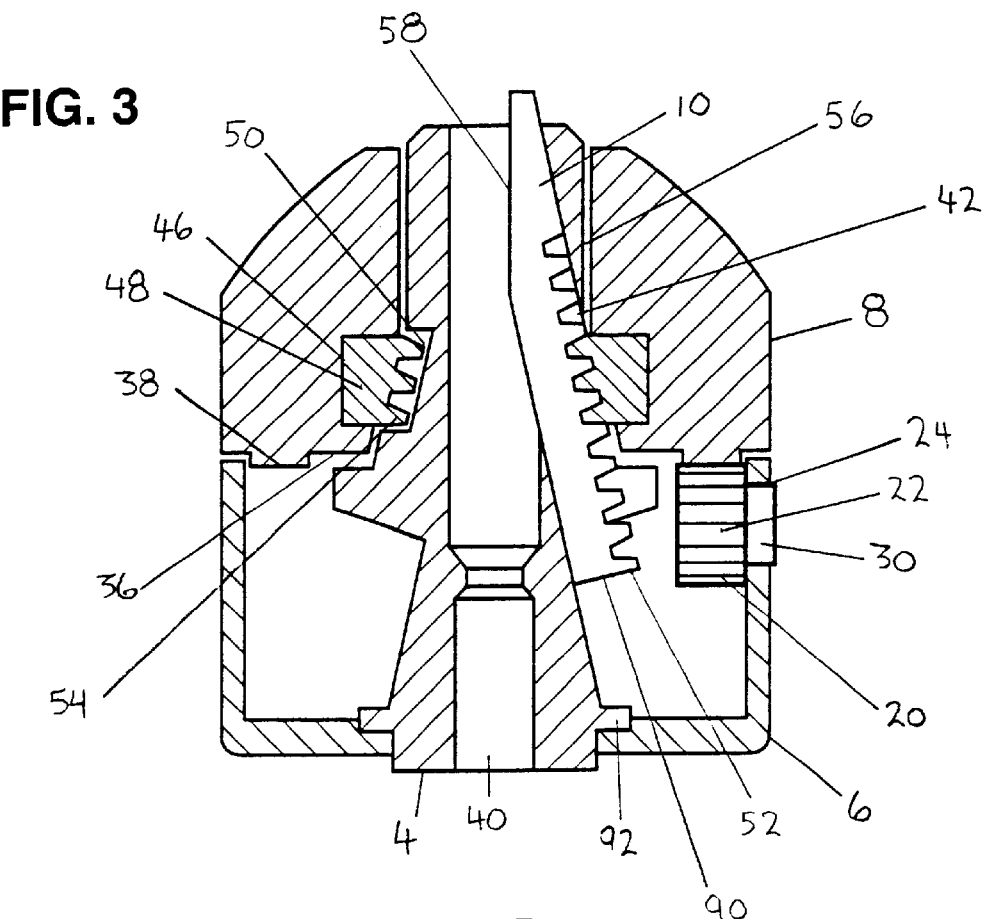
FIG. 3 is a cross sectional view of the chuck showing the chuck body, tail piece and tightening knob.

The chuck apparatus according to a preferred embodiment of the present invention comprises a chuck body, a tightening knob, and a tail piece. Referring to FIG. 1, a perspective view of the keyless chuck with the jaws fully advanced, keyless chuck 2 is comprised of cylindrical chuck body 4 which is housed inside tail piece 6 and tightening knob 8. Tightening knob 8 and tail piece 6 are arranged in a stacked configuration. Jaws 10 extend axially from chuck body 4. Dust ring 12 (only illustrated in FIG. 1) is attached to tightening knob 8 and spans across clearance gap 56 (see FIG. 3) onto chuck body 4 so as to prevent debris from fouling the operation of chuck 2. Tightening knob 8 has a cylindrical configuration terminating in a radiused frusticonical face 16. Grooves 14 are formed in cylindrical face 18 and extend partially along its longitudinal axis. Pinion gear 20 and key recess 22 can be seen protruding through tail piece bore 24 in tail piece 6.

Looking at FIG. 2, an exploded view of the keyless chuck, it can be seen that pinion gear 20 with pinion gear teeth 27, has shoulder 30 extending perpendicularly from gear face 32. Shoulder 30 has key recess 22 formed therein that matingly engages with hex key 34. Tightening knob 8 has rear face 36 with planar ring gear 28 and teeth 38 formed thereon. The interconnective alignment of pinion gear 20 with ring gear 28 and tail piece recess 24 is illustrated.

FIG. 3, a cross sectional view of the chuck, illustrates the physical orientation of the internal components of chuck 2. Tail piece 6 is fixedly attached to chuck body 4. Shoulder 30 acts as a plain bearing for pinion gear 20 to rotate on within tail piece bore 24 and also acts to retain pinion gear 20 within bore 24. Pinion gear teeth 27 matingly engage planar ring gear teeth 38. Recess 40 is bored longitudinally through chuck body 4. Three jaw passages 42 are bored inclinedly through chuck body 4 and are in communication with recess 40. Jaw passages 42 are oriented so as to be converging passages and are spaced approximately angularly equidistant about the longitudinal axis of chuck body 4. Jaws 10 are of a generally cylindrical configuration with rack teeth 52 and tapered faces 58 located on the exterior longitudinal surface of jaw 10 approximately 180 degrees apart. Jaws 10 reside in jaw passage 42 oriented such that rack teeth 52 face into annular groove 50 of chuck body 4 at an acute angle with respect to the longitudinal axis of chuck body 4. Threaded ring 48 frictionally fits into annular recess 46 in tightening knob 8 such that threads 54 extend into annular groove 50 in chuck body 4 and engage with rack teeth 52 of jaws 10. There is a clearance gap 56 between chuck body 4 and tightening knob 8.

Figure 4:
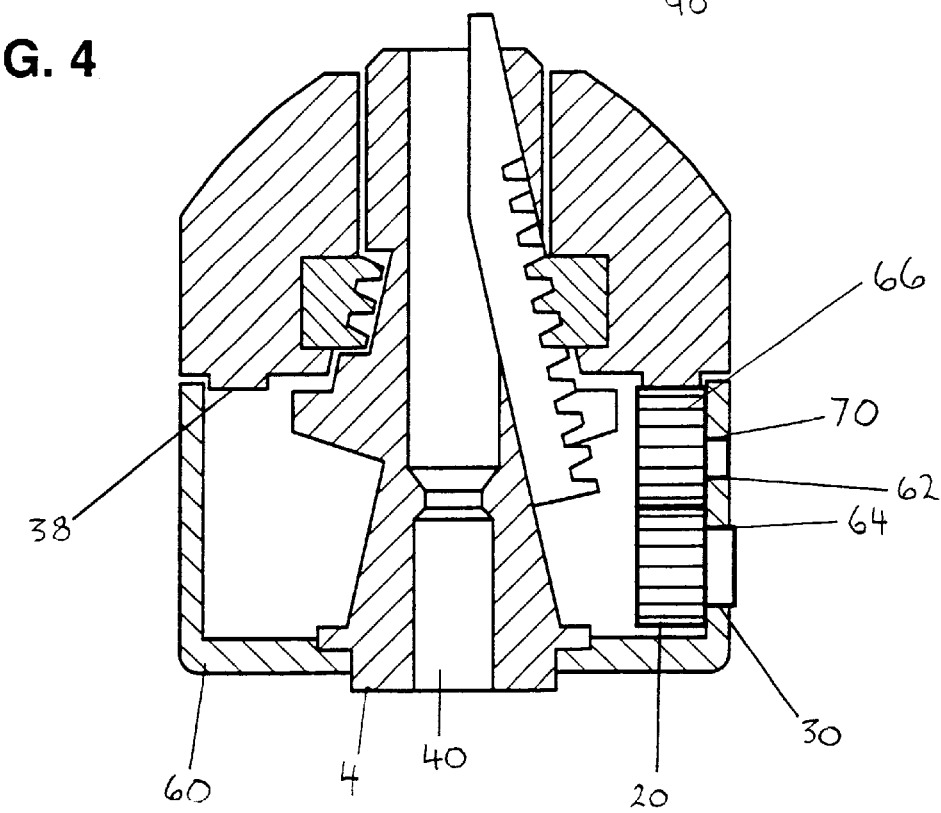
FIG. 4 is a cross sectional view of a second embodiment chuck showing the chuck body, a modified tail piece, tightening knob and idler gear.

FIG. 4, a cross sectional view of a second embodiment chuck with a modified tail piece, illustrates first modified tail piece 60 with tail piece idler gear bore 62 and tail piece pinion gear bore 64. Pinion gear 20 is secured into pinion gear bore 64 by pinion gear shoulder 30. Tail piece idler gear 66 is secured into tail piece idler gear bore 62 by idler gear shoulder 70. Idler gear 66 engages planar ring gear 38 and pinion gear 20.

Figure 5:
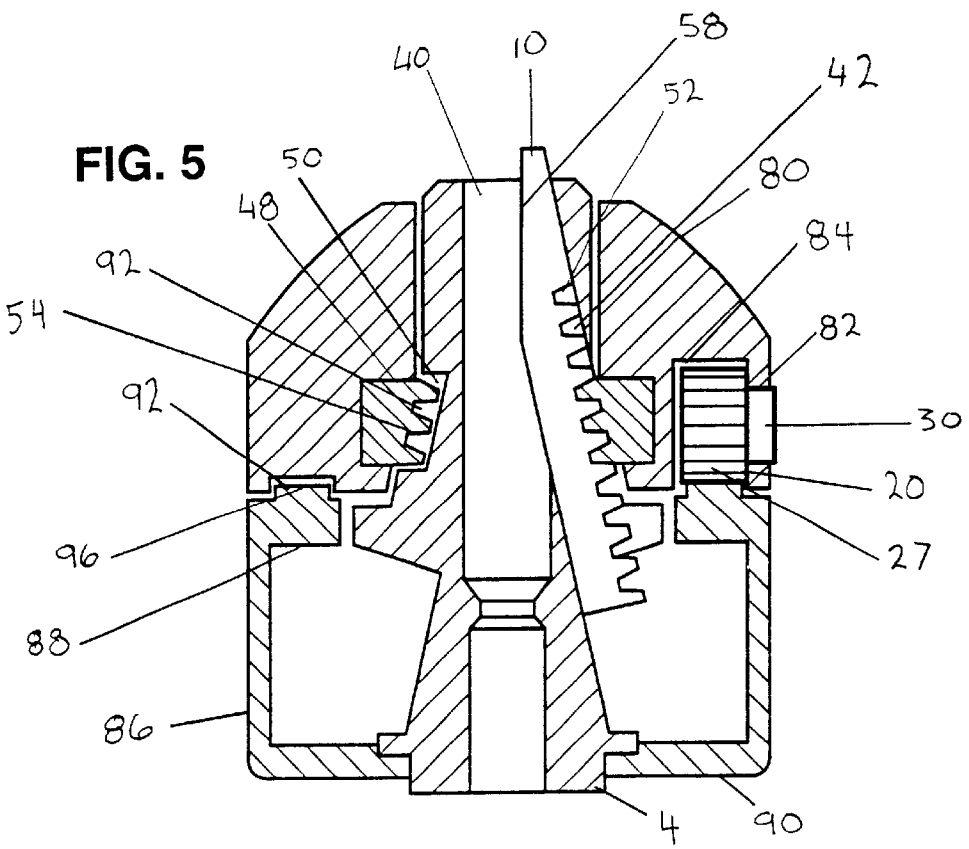
FIG. 5 is a cross sectional view of a third embodiment chuck with a showing the chuck body, tail piece and modified tightening knob.

FIG. 5, a cross sectional view of a third embodiment chuck, shows pinion gear 20. housed by shoulder 30 in orifice 82 of first modified tightening knob 80. Pinion gear 20 resides in void 84. Recess 40 is bored longitudinally through chuck body 4. Three jaw passages 42 are bored inclinedly through chuck body 4 and are in communication with recess 40. Jaw passages 42 are orientated so as to be converging passages and are spaced approximately equidistant about the longitudinal axis of chuck body 4. Jaw 10 is of a generally cylindrical configuration with rack teeth 52 and tapered face 58 located on the exterior longitudinal surface of jaw 10 180 degrees apart. Jaw 10 resides in jaw passage 42 oriented such that rack teeth 52 face into annular groove 50 at an acute angle with respect to the longitudinal axis of chuck body 4. Threaded ring 48 frictionally fits into annular recess 92 in first modified tightening knob 80 such that threads 54 extend into annular groove 50 in chuck body 4 and engage with rack teeth 52 of jaw 10. There is a clearance gap 56 between chuck body 4 and first modified tightening knob 80. Second modified tail piece 86 has a hollow cylindrical shape with upper flange 88 and lower flange 90. Upper flange 88 forms planar ring gear 92 having teeth 96 which engages teeth 27 of pinion gear 20. Lower flange 90 is fixedly attached to chuck body 4.

Figure 6:
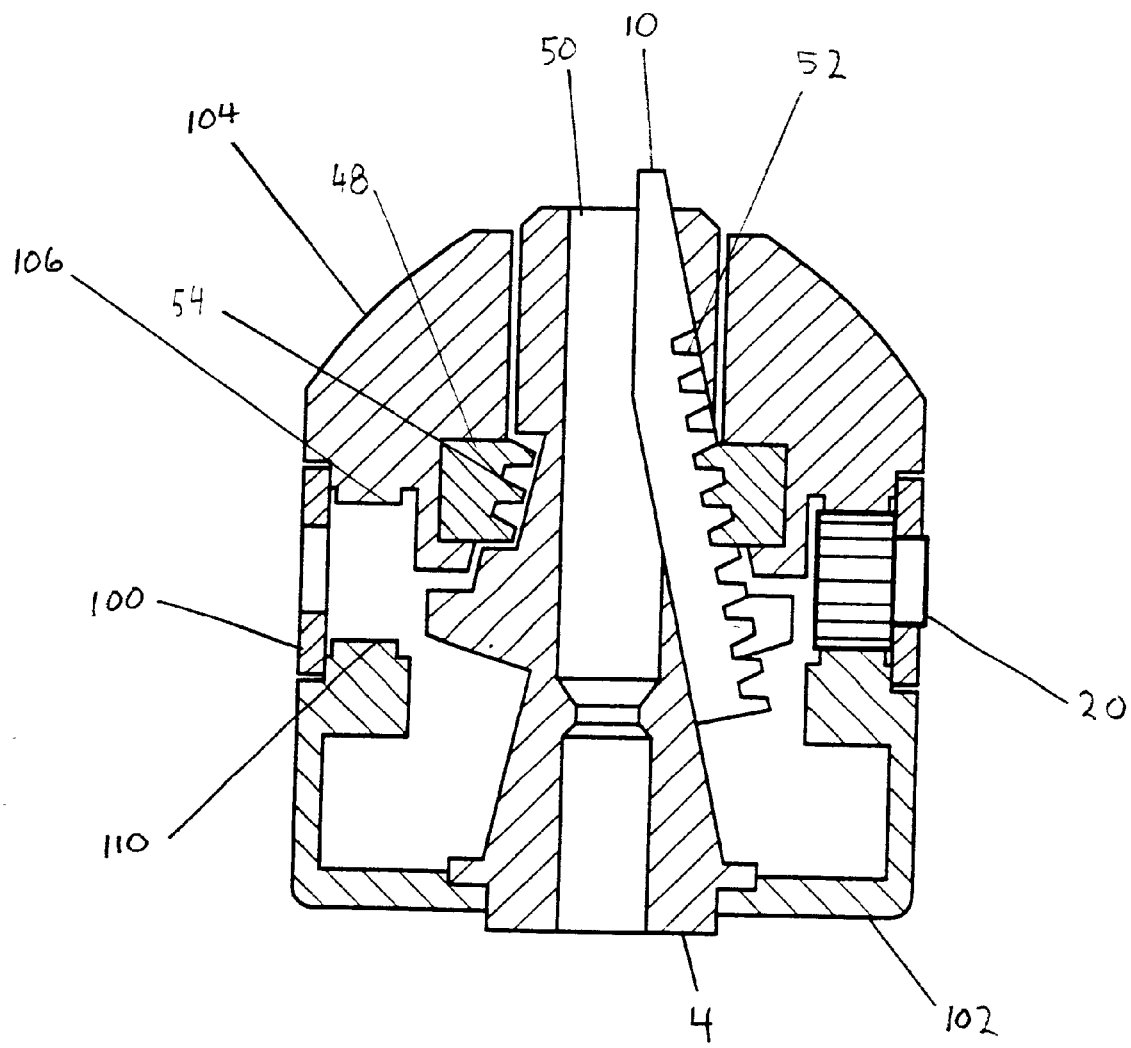
FIG. 6 is a cross sectional view of a fourth embodiment chuck showing the chuck body, tail piece, tightening knob and floating ring.

FIG. 6, a cross sectional view of a fourth embodiment chuck, shows external floating ring 100 housed in a stacked arrangement between third modified tail piece 102 and second modified tightening knob 104. Second modified tightening knob 104 has planar ring 106 with teeth 108 formed on a surface thereof that is perpendicular to the longitudinal axis of chuck body 4. Third modified tail piece 102 has planar ring gear 110 with teeth 112 formed on a surface thereof that is perpendicular to the longitudinal axis of chuck body 4 and parallel planar ring gear 106. Floating ring 100 is of a generally hollow cylindrical shape with recess 118. Floating ring 100 fits into the space defined by tail piece groove 114 and tightening knob groove 116. Shoulder 30 on pinion gear 20 resides in floating ring recess 118 and teeth 30 of pinion gear 20 matingly engage teeth 108 and 112 simultaneously.

Figure 7:
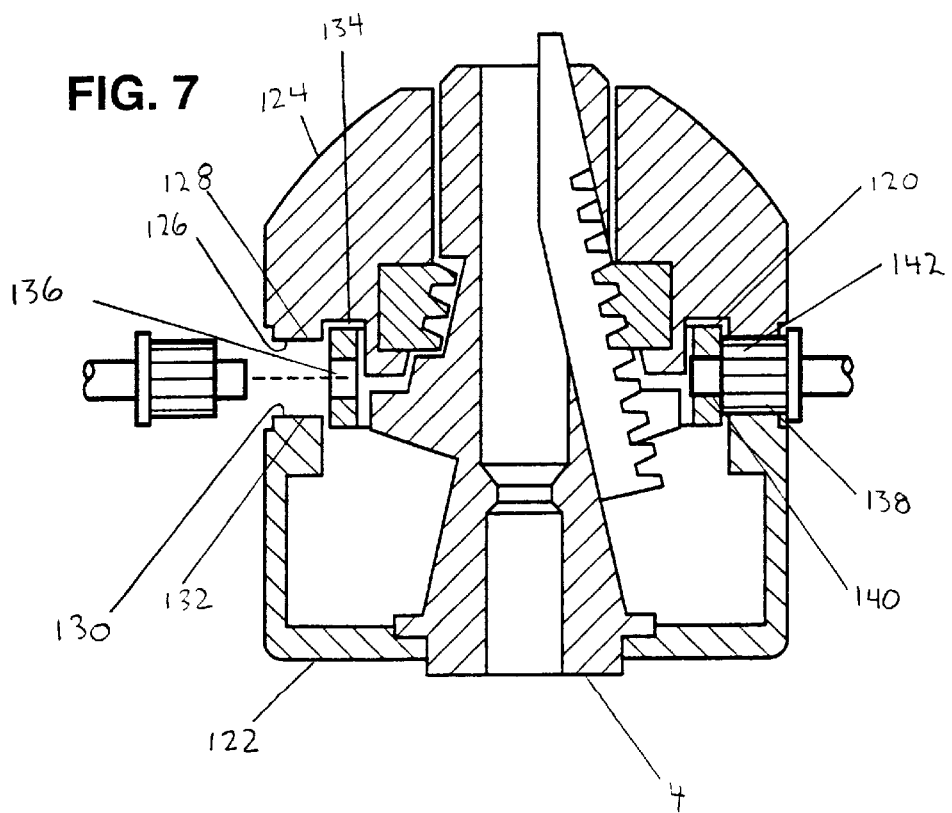
FIG. 7 is a cross sectional view of the fourth embodiment chuck showing the chuck body, tail piece, tightening knob and an internally housed floating ring.

FIG. 7, a cross sectional view of the fifth embodiment chuck, shows internal floating ring 120 housed in a stacked arrangement between fourth modified tail piece 122 and third modified tightening knob 124. Third modified tightening knob 124 has planar ring 126 with teeth 128 formed on a surface thereof that is perpendicular to the longitudinal axis of chuck body 4. Fourth modified tail piece 122 has planar ring gear 130 with teeth 132 formed on a surface thereof that is perpendicular to the longitudinal axis of chuck body 4 and parallel planar ring gear 126. Floating ring 120 is of a generally hollow cylindrical shape with recess 136. Floating ring 120 resides in groove 134 cut in third modified tightening knob 124. Chuck key 138 has shoulder 140 and teeth 142 formed thereon. Shoulder 140 can be fit into recess 136 such that chuck key teeth 142 will matingly engage tightening knob planar ring gear teeth 128 and tail piece planar ring gear teeth 132 simultaneously.

Tightening knob 8 facilitates the "keyless" operation. It has a gripable outer surface, and is sized to allow sufficient mechanical advantage when hand rotating (I.E. without a key) to secure a tool bit in jaws 10 such that the rotating tool (generally a drill) can be operated without the tool bit loosening or disengaging from jaws 10. This type of chuck is well known in the industry.

Now referring to FIGS. 1–3 it can be seen that in operation, rotating tightening knob 8 with respect to tail piece 6 causes threads 54 of threaded ring 48 to engage rack teeth 52 so as to slidingly advance or retract jaws 10 in jaw passages 42 until tapered faces 58 of jaws 10 contact each other or until bottom face 90 contacts abutment 92 of chuck body 4. Rotating tightening knob 8 with respect to tail piece 6 also causes pinion gear 20 to rotate on shoulder 30 in tail piece bore 24 by virtue of its engagement with teeth 38 of ring gear 36. This mating engagement between pinion gear 20 and ring gear 36 can also allow additional torque to be exerted on tightening knob 8 to slidingly advance or retract jaws 10 in jaw passages 42 when hex key 34 is inserted into key recess 22 and rotated. Although jaws 10 can be tightened or loosened by hand manipulation of tightening knob 8 with respect to tail piece 6, jaws 10 may also be tightened or loosened with additional mechanical advantage provided by a rotating hex key 34. Although the mechanical advantage is provided through six sided hex key 34, any, key style tool configuration, as commonly known in the industry, would function equally as well provided that key recess 22 was configured to match.

FIG. 4 is a second embodiment wherein first modified tail piece 60 houses idler gear 66 in mated engagement with pinion gear 20. Idler gear 66 is in mated engagement with ring gear 38. This configuration accomplishes a substantially similar jaw tightening and loosening function as described in the preferred embodiment with a reverse rotation of pinion gear 20.

FIG. 5 is a third embodiment wherein pinion gear 20 is housed in first modified tightening knob 80 and ring gear 92 is located on upper flange 88 of second modified tail piece 86. Manual operation of this embodiment in the keyless mode is the same as that of the preferred embodiment to the user, however internally, as first modified tightening knob 80 is rotated with respect to second modified tail piece 86, pinion gear 20 is rotated by mating engagement with tail piece ring gear 92. When hex key 34 is inserted into pinion gear recess 22 and rotated, teeth 27 will rotate second modified tail piece 86 and chuck body 4 thereby revolving jaws 10 around the longitudinal axis of chuck body 4 such that rack teeth 52, which are engaged with stationary threads 54 of threaded ring 48, advance or retract jaws 10 slidingly along jaw passages 42. In this manner additional torque and mechanical advantage can be added to tighten or loosen the jaws.

Referring to the fourth embodiment of FIG. 6 the advancement of jaws 10 is still accomplished by rotation of jaw teeth 52 with respect to threads 54 of threaded ring 48 as in all of the embodiments. This alternate embodiment incorporates planar ring gears on both second modified tightening knob 104 and third modified tail piece 102. With pinion gear 20 engaged with tightening knob planar ring gear 106 and tail piece planar ring gear 110, both second modified tightening knob 104 and third modified tail piece 102 are rotated simultaneously when hex key 34 is inserted into key recess 22 and rotated for keyed operation. This reduces the number of rotations of key 34 that are required to fully open or close jaws 10 as compared to chuck embodiments incorporating only one planar ring gear, but requires more torque to accomplish each rotation. The floating ring 100 houses pinion gear 20 in a stationary position about the axis of chuck body 4 while second modified tightening knob 104 and third modified tail piece 102 revolve about this axis.

The fifth embodiment in FIG. 7 functions similarly to the fourth alternate embodiment since both embodiments utilize two planar ring gears for keyed operation, except there is no pinion gear 20 rotated by hex key 34. Instead shoulder 140 of a conventional chuck key 138, standardized in the industry, is inserted into recess 136 of internal floating ring 120 such that teeth 142 matingly engage teeth 128 of tightening knob planar ring gear 126 and teeth 132 of tail piece planar ring gear 130. Floating ring 120 maintains key 138 in a stationary position about the axis of chuck body 4 while third modified tightening knob 124 and fourth modified tail piece 122 revolve about this axis.

This additional mechanical advantage in the "key mode" allows the jaws in all embodiments to be tightened beyond what could be accomplished by hand manipulation in the "keyless chuck" mode. This is useful in situations where the tool to be gripped is not of uniform diameter or when working on particularly hard surfaces. This additional mechanical advantage also allows. for the jaws to be loosened when the tool has stopped rotating in the work material and the driver has input additional torque to tighten the jaws on the tool beyond what could be accomplished by hand manipulation.

The coupling of the driver mechanism (not part of this invention) to chuck body 4 is accomplished in several ways as is well known in the industry. Commonly, tapered or threaded shafts or sleeves are fixedly engaged in the longitudinal bore 40 of chuck body 4. Although chuck body 4 is illustrated with a smooth bore 40 this bore can also be threaded or otherwise adapted to receive the driver mechanism's drive shaft.

The amount of mechanical advantage or torque available to tighten or loosen the jaws of the various chuck embodiments is determined through the gearing ratios, configurations and designs of the pinion gear, idler gear, planar ring gears and check key as is well known in the industry.

While a preferred embodiment of the present invention and four alternate embodiments have been shown and described, it will be apparent to those skilled in the art that many changes and modifications may be made. without departing from the invention in its broader aspects. The appended claims are therefore intended to cover all such changes and modifications as fall within the true spirit and scope of the invention.

What is claimed is:

1. A chuck capable of fully tightening it's jaws around a tool bit with or without the use of a key in the form of a hex wrench or a standard and commonly available tool, comprising:
   a chuck body housing a plurality of adjustable jaws adapted for gripping and releasing tools;
   a means for keyless operation of said chuck whereby rotation of said means opens and closes said jaws; and
   a means for keyed operation of said chuck jaws whereby said means receives a hex key that when rotated opens and closes said jaws.

2. The chuck of claim 1 wherein said chuck is a drill chuck.

3. A chuck comprising:
   an axially bored chuck body with a forward end and a rear end, and a plurality of jaw passages formed therein inclined axially forward to intersect said axial bore in an angularly spaced arrangement;
   a plurality of jaws with gear teeth formed thereon and slidably positioned in said jaw passages;
   a circumferential groove formed in said chuck body about a longitudinal axis of said chuck body intersecting said jaw passages so as to expose said gear teeth;
   a generally cylindrical tightening knob with a gripable outer surface rotatably attached about said forward end of said chuck body and a planar ring gear formed on a face thereof and an internal threaded ring having rotational dependence with said jaw teeth to enable sliding movement of said jaws within said jaw passages with enough force to grip a tool bit for operational rotation when said tightening knob is hand rotated about the axis of said chuck body with respect to said chuck body; and
   a cylindrical tail piece fixedly attached to the rear section of said chuck body with a rotatable pinion gear accessibly housed therein and adapted to rotate in response to rotation of said planar ring gear;
   wherein said pinion gear defines a recess adapted to receive a matingly formed key device for enabling rotation of said pinion gear.

4. The chuck of claim 3 wherein said rear section of said chuck body is adapted for receiving a driven shaft of a drill.

5. The chuck of claim 3 wherein said key device is a hex wrench.

6. The chuck of claim 3 wherein said rotatable pinion gear is adapted to rotate in response to a rotation of said planar ring gear by engagement with said planar ring gear on said tightening knob.

7. The chuck of claim 3 wherein said cylindrical tail section further comprises an internally housed rotation reversing gear, and wherein said rotatable pinion gear is adapted to rotate in response to a rotation of said planar ring gear by engagement with said rotation reversing gear wherein said rotation reversing gear is in simultaneous engagement with said pinion gear and said planar ring gear.

8. A chuck capable of fully tightening it's jaws around a tool bit with or without the use of a key comprising:
   an axially bored chuck body with a forward end and a rear end and a plurality of jaw passages formed therein and inclined axially forward to intersect said axial bore in an angularly spaced arrangement;
   a plurality of jaws with gear teeth formed thereon and slidably positioned in said jaw passages;
   a circumferential groove formed in said chuck body about a longitudinal axis of said chuck body intersecting said jaw passages so as to expose said gear teeth;
   a cylindrical tightening knob with a gripable outer surface rotatably attached about said forward end of said chuck body with a rotatable pinion gear accessibly housed therein and an internal threaded ring having rotational dependence with said jaw teeth to enable sliding movement of said jaws within said jaw passages with enough force to grip a tool bit for operational rotation when said tightening knob is rotated by hand about the axis of said chuck body with respect to said chuck body; and
   a cylindrical tail section fixedly attached to the rear section of said chuck body with a planar ring gear formed on a face thereof matingly engaged with said pinion gear and adapted to rotate in response to rotation of said pinion gear;
   wherein said pinion gear defines a recess adapted to receive a key device for enabling rotation of said pinion gear.

9. The chuck of claim 8 wherein said rear section of said chuck body is adapted for receiving a driven shaft.

10. The chuck of claim 8 wherein said key device is a hex wrench.

11. A chuck comprising:
   a axially bored chuck body with a forward end and a rear end and a plurality of jaw passages formed therein and inclined axially forward to intersect said axial bore in an angularly spaced arrangement;
   a plurality of jaws with gear teeth formed thereon and slidably positioned in said jaw passages;
   a circumferential groove formed in said chuck body about a longitudinal axis of said chuck body intersecting said jaw passages so as to expose said gear teeth;
   a cylindrical tightening knob with a gripable outer surface rotatably attached about said forward end of said chuck body with a first planar ring gear formed on a face thereof and an internal threaded ring having rotational dependence with said jaw teeth to enable sliding movement of said jaws within said jaw passages when said tightening knob is rotated about the axis of said chuck body with respect to said chuck body;
   a cylindrical tail section fixedly attached to the rear section of said chuck body with a second planar ring gear formed on a face thereof, and
   a floating ring situated between said tightening knob, and said tail section wherein said floating ring accessibly houses a rotatable pinion gear that defines a recess adapted to receive a key device for enabling rotation of said pinion gear; wherein said pinion gear is simultaneously engaged with said first and said second planar ring gears and is adapted to rotate coincident with rotation of said first planar ring gear, said second planar ring gear or both first and second planar ring gears when rotated in opposite angular directions.

12. The chuck of claim 11 wherein said rear section of said chuck body is adapted for receiving a driven shaft.

13. The chuck of claim 11 wherein said key device is a hex wrench.

14. A chuck comprising:

a axially bored chuck body with a forward end and a rear end and a plurality of jaw passages formed therein and inclined axially forward to intersect said axial bore in an angularly spaced arrangement;

a plurality of jaws with gear teeth formed thereon and slidably positioned in said jaw passages;

a circumferential groove formed in said chuck body about a longitudinal axis of said chuck body intersecting said jaw passages so as to expose said gear teeth;

a cylindrical tightening knob with a gripable outer surface rotatably attached about said forward end of said chuck body with a first planar ring gear formed on a face thereof and an internal threaded ring having rotational dependence with said jaw teeth to enable sliding movement of said jaws within said jaw passages when said tightening knob is rotated about the axis of said chuck body with respect to said chuck body;

a cylindrical tail section fixedly attached to the rear section of said chuck body with a second planar ring gear formed on a face thereof; and a floating ring situated between said tightening knob, and said tail section wherein said floating ring is adapted to receive a keyed device therein with a profile that matingly corresponds to said first planar ring gear and said second planar ring gear and align it into simultaneous meshing engagement with said first planar ring gear and said second planar ring gears;

wherein rotation of said keyed device is coincident with rotation of said first planar ring gear and said second planar ring gear when planar gears are rotated in opposite angular directions with respect to each other.

15. The chuck of claim 14 wherein said keyed device is a drill chuck.

16. The chuck of claim 14 wherein said rear section of said chuck body is adapted for receiving a driven shaft.

17. The chuck of claim 14 wherein said key device is a hex wrench.

18. A drill chuck comprising:

a axially bored chuck body with a forward end and a rear end and a plurality of coaxially arranged jaw passages formed therein and inclined axially forward to collectively intersect said axial bore;

a plurality of jaws with gear teeth formed on a proximal section thereof and slidably positioned in said jaw passages;

a circumferential groove formed in said chuck body about a longitudinal axis of said chuck body intersecting said jaw passages so as to expose said gear teeth;

a cylindrical tightening knob with a gripable outer surface rotatably attached about said forward end of said chuck body with a planar ring gear formed on a face thereof and an internal screw ring having rotational dependence with said jaw gear teeth to enable sliding movement of said jaws within said jaw passages with enough force to grip a tool bit for operational rotation when said tightening knob is hand rotated about the axis of said chuck body with respect to said chuck body; and a cylindrical tail section fixedly attached to the rear section of said chuck body with a rotatable pinion gear accessibly housed therein and engaged to said planar ring gear on said tightening knob;

wherein said pinion gear defines a recess adapted to receive a key device for enabling rotation of said pinion gear.

19. The chuck of claim 18 wherein said key device is a hex wrench.

20. The chuck of claim 18 wherein said key device is a standard and commonly available tool.

* * * * *